(12) United States Patent
Umemoto et al.

(10) Patent No.: US 6,459,461 B1
(45) Date of Patent: Oct. 1, 2002

(54) LIQUID-CRYSTAL DISPLAY DEVICE

(75) Inventors: Seiji Umemoto; Naoki Takahashi, both of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/571,539

(22) Filed: May 16, 2000

(30) Foreign Application Priority Data

May 17, 1999 (JP) .......................................... 11-135334

(51) Int. Cl.$^7$ ............................................ G02F 1/1335
(52) U.S. Cl. ...................................................... 349/65
(58) Field of Search ........................................... 349/65

(56) References Cited

U.S. PATENT DOCUMENTS

| | | | | |
|---|---|---|---|---|
| 5,914,760 A | * | 6/1999 | Daiku ........................... | 349/65 |
| 5,917,565 A | * | 6/1999 | Suzuki .......................... | 349/65 |
| 6,124,906 A | * | 9/2000 | Kawada et al. ................ | 349/65 |
| 6,222,598 B1 | * | 4/2001 | Hiyama et al. ................ | 349/65 |

FOREIGN PATENT DOCUMENTS

| | | | |
|---|---|---|---|
| EP | 0 913721 A1 | 5/1999 | ......... G02F/1/1335 |
| JP | 8-94844 | 4/1996 | ............ G02B/6/00 |
| JP | A-10-106328 | 4/1998 | ............. F21V/8/00 |

* cited by examiner

*Primary Examiner*—James A. Dudek
(74) *Attorney, Agent, or Firm*—Sughrue Mion, PLLC

(57) ABSTRACT

A liquid-crystal display device has a light pipe, a light source, a reflection polarizer, and a liquid-crystal shutter. The light pipe includes light output means formed on an upper surface of the light pipe. The light source is disposed near to an incident side surface of the light pipe so that incident light from the light source is output from a lower surface of the light pipe through the light output means. The reflection polarizer is disposed on the lower surface of the light pipe for supplying linearly polarized light obtained by reflecting natural light. The liquid-crystal shutter is disposed above the upper surface of the light pipe, the liquid-crystal shutter including liquid crystal cells and at least one polarizing plate.

11 Claims, 3 Drawing Sheets

LIQUID-CRYSTAL DISPLAY DEVICE

BACKGROUND OF THE INVENTION

1. Field of the Invention

The present invention relates to a liquid crystal display device which is excellent in light utilizing efficiency and which provides a brilliant display easy to see.

The present application is based on Japanese Patent Application No. Hei. 11-135334, which is incorporated herein by reference.

2. Description of the Related Art

There is investigation of a liquid-crystal display device which is used both in a reflection and a transmission mode so that the device can be visually recognized in use of the transmission type liquid-crystal display device in a dark place, or the like, by addition of an illuminator while the merit of a reflection type liquid-crystal display device of small power consumption is used widely. For example, a liquid-crystal display device using a semi-transmission type reflection plate, or the like, has been proposed. The system utilizing such a semi-transmission type reflection plate, however, had a disadvantage that the system in either mode was inferior in brightness to the reflection or transmission type device for exclusive use because light was separated into reflected and transmitted light by a half-mirror effect.

In consideration of the above description, there was a proposal for performing the improvement by using a reflection polarizer in which the sum of reflectivity and transmissivity was able to exceed 100%. The plane of vibration of linearly polarized light was, however, changed (by 90 degrees) between reflection and transmission, so that display was inverted. Hence, when a light was switched on in the evening twilight to make visual recognition in a transmission mode, display based on a reflection mode emphasized contrast so that the display became hard to see in either mode in the evening twilight. Moreover, the display became dark in a transmission mode because of absorption by a light absorber disposed for preventing a black display from being conspicuous. There was a problem that lowering of blackness due to the conspicuousness made contrast low if the aforementioned disadvantage was to be corrected.

SUMMARY OF THE INVENTION

An object of the present invention is to develop a liquid-crystal display device of a good visual recognition property which is excellent in brilliance both in a reflection and a transmission mode and in which inversion of display does not occur.

According to the present invention, there is provided with a liquid-crystal display device comprising: a light pipe including light output means formed on an upper surface of the light pipe; a light source disposed near to an incident side surface of the light pipe so that incident light from the light source is output from a lower surface of the light pipe through the light output means; a reflection polarizer disposed on the lower surface of the light pipe for supplying linearly polarized light obtained by reflecting natural light; and a liquid-crystal shutter disposed above the upper surface of the light pipe, the liquid-crystal shutter including liquid crystal cells, and at least one polarizing plate.

According to the present invention, a structure in which a light pipe is disposed between a reflection polarizer and liquid-crystal cells is provided so that linearly polarized light supplied through reflection by the reflection polarizer can be directly utilized for liquid-crystal display. Absorption loss due to the polarizing plate on the visual recognition back surface can be prevented. Lowering of light utilizing efficiency in a reflection mode is slight to be no more than absorption loss, reflection loss, etc. due to the light pipe. As a result, brilliance approximately equivalent to that of a background-art reflection type liquid-crystal display device can be achieved in a reflection mode. Moreover, brilliance not at all inferior to that of a background-art transmission type liquid-crystal display device can be achieved in a transmission mode. Leakage light is also slight, so that high contrast can be achieved. In addition, inversion of display does not occur between reflection and transmission, so that a liquid-crystal display device of a good visual recognition property can be obtained.

Moreover, a light path in the light pipe in the transmission mode can be elongated by provision of the light output means on the upper surface of the light pipe. Hence, the spread of light is widened, so that the intensity of a bright line can be relaxed. This effectively acts on both prevention of occurrence of moire and enhancement of uniformity of brightness advantageously, so that the reflection polarizer can be disposed on the lower surface of the light pipe so as to be brought into contact with and integrated with the light pipe through a tacky layer, or the like, easily. If such light output means is provided on the lower surface of the light pipe, it is necessary to provide a reflection polarizer separately in terms of the maintenance of the function of the light output means. As a result, the structure of the device is complicated because of increase in the number of parts and arrangement and fixation of the reflection polarizer.

Further, in the case of a light pipe having light output means constituted by slopes such as prism-like irregularities, the light pipe is excellent in directivity of reflected light through the slopes. Accordingly, light advantageous to visual recognition in a transmission mode can be formed efficiently, so that more brilliant display can be obtained. The light pipe is further excellent both in incident efficiency of external light and in transmission efficiency after reflection thereof. Accordingly, more brilliant display can be obtained also in a reflection mode by light emission excellent both in light utilizing efficiency and in uniformity. Further, generation of moire due to the foregoing directivity can be suppressed by oblique arrangement of the light output means, so that inhibition of visual recognition due to dazzling light can be prevented from being generated.

In a light pipe having scatter type light output means such as dots, embossed irregularities, or the like, used as the aforementioned light output means, output light in a transmission mode is output at a large angle of about 60 degrees. Accordingly, display becomes dark and hard to see in a frontal (vertical) direction. In addition, contrast is lowered by scattered light directly incident on the liquid-crystal cells. Accordingly, when a prism sheet is disposed for the purpose of controlling a light path, light is scattered in a reflection mode. As a result, a large part of light makes no contribution, so that display becomes very dark. Also in a reflection mode, external light is scattered by the light pipe, so that display becomes dark and hard to see because reflected light sufficient to be utilized for liquid-crystal display cannot be obtained through the reflection polarizer. Moreover, dots, or the like, are visually recognized too conspicuously. Accordingly, when a diffusion layer intensive in diffusing property is disposed as a countermeasure, both incident light in a reflection mode and reflected light thereof by the reflection polarizer are scattered to thereby make display dark.

Features and advantages of the invention will be evident from the following detailed description of the preferred embodiments described in conjunction with the attached drawings.

DETAILED DESCRIPTION OF THE PREFERRED EMBODIMENTS

Figure 1:
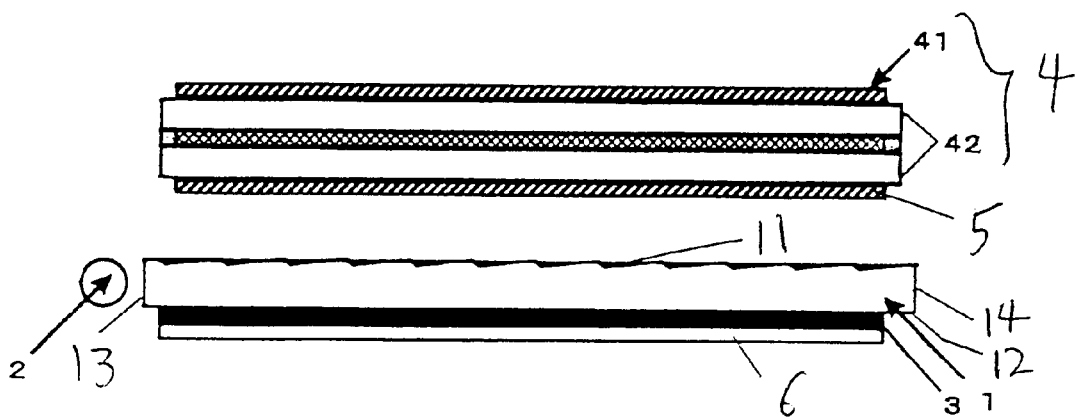
FIG. 1 shows an explanatory sectional view of an example of a liquid-crystal display device.

According to the present invention, the liquid-crystal display device comprises: a light pipe including light output means on an upper surface of the light pipe; a light source disposed near to an incident side surface of the light pipe so that incident light from the light source is output from a lower surface of the light pipe through the light output means; a reflection polarizer disposed on the lower surface of the light pipe for supplying linearly polarized light obtained by reflecting natural light; and a liquid-crystal shutter disposed above the upper surface of the light pipe, the liquid-crystal shutter including liquid crystal cells, and at least one polarizing plate. The liquid-crystal display device according to the present invention is preferably used as a device which can be used both in reflection and transmission modes. FIG. 1 shows an embodiment of the liquid-crystal display device. The reference numeral 1 designates a light pipe; 11, an upper surface forming light output means of the light pipe 1; 2, a light source; 3, a reflection polarizer; 4, a liquid-crystal shutter; 41, a polarizing plate; and 42, liquid-crystal cells.

As shown in the embodiment of FIG. 1, used as the light pipe is a plate-like material which has an upper surface 11, a lower surface 12 opposite to the upper surface, and an incident side surface 13 constituted by a side surface between the upper and lower surfaces and which is configured so that light incident on the incident side surface is output from the lower surface through the light output means formed on the upper surface 11. The light pipe may be of a uniform thickness type as illustrated in FIG. 1 or may be of a type in which the thickness of an opposite end 14 opposite to an incident side surface 13 is set to be smaller than that of the incident side surface. Reduction of the thickness of the opposite end is advantageous in terms of reduction of weight, improvement of efficiency of light incident on the incident side surface toward the light output means of the upper surface, and so on.

The light output means provided on the upper surface of the light pipe can be constituted by an appropriate member exhibiting the aforementioned output property. From the point of view of obtaining illumination light excellent in frontal directivity through the reflection polarizer, the preferred is light output means having slopes facing the incident side surface, particularly light output means constituted by prism-like irregularities.

Figure 2:
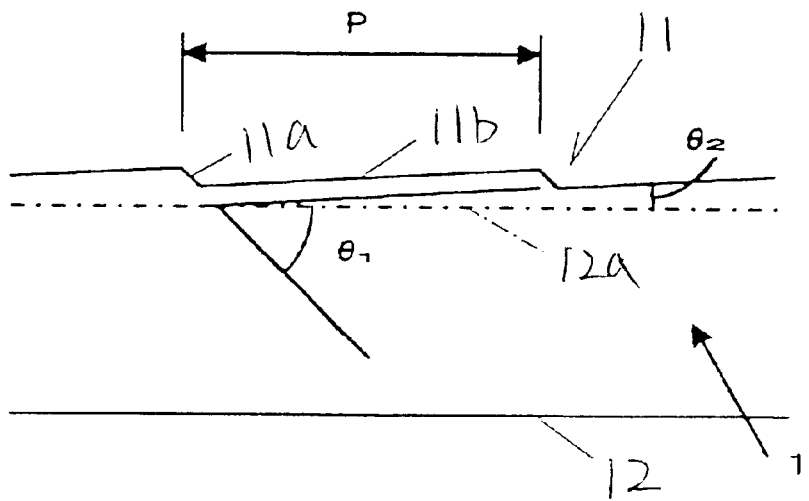
FIG. 2 shows an explanatory side view of light output means in a light pipe.

Although the aforementioned prism-like irregularities may be constituted by projections or recesses having equilateral surfaces, it is preferable from the point of view of light utilizing efficiency, or the like, that the prism-like irregularities are constituted by projections or recesses each having a short side and a long side surface. FIG. 2 shows an example of the prism-like irregularities. The reference numeral 11a designates a short side surface; and 11b, a long side surface.

The light output means preferred from the point of view of achieving the aforementioned property such as frontal directivity, or the like, is constituted by a repetitive structure of irregularities each of which has a slope inclined at an inclination angle of from 35 to 45 degrees with respect to a reference plane of the lower surface, and a flat surface inclined at an angle of not larger than 10 degrees. Especially, as shown in FIG. 2, the light output means is constituted by a repetitive structure of prism-like irregularities each of which has a short side surface 11a ($\Theta_1$) inclined downward from the incident side surface 13 toward the opposite end 14 at an inclination angle of from 35 to 45 degrees with respect to the reference plane 12a of the lower surface 12, and a long side surface 11b ($\Theta_2$) inclined upward at an inclination angle of from 0 to 10 degrees, exclusive of 0 degree, with respect to the same reference plane 12a.

In the above description, the short side surface 11a formed as a slope inclined downward from the incident side surface toward the opposite end plays a role of reflecting light incident on the short side surface among incident light given from the incident side surface to thereby supply the reflected light to the lower surface (reflection polarizer). In this case, setting the inclination angle $\theta_1$ of the short side surface to be in a range of from 35 to 45 degrees permits transmitted light to be reflected well perpendicularly to the lower surface as shown by the polygonal line arrow in FIG. 3. As a result, output light (illumination light) excellent in frontal directivity can be obtained through the reflection polarizer 3 efficiently.

The preferred inclination angle $\theta_1$ of the short side surface from the point of view of the aforementioned frontal directivity, or the like, is in a range of from 38 to 44 degrees, especially in a range of from 40 to 43 degrees, in consideration of the fact that the condition for total internal reflection of light transmitted in the inside of the light pipe on the basis of Snell laws of refraction is generally ±41.8 degrees.

Figure 3:
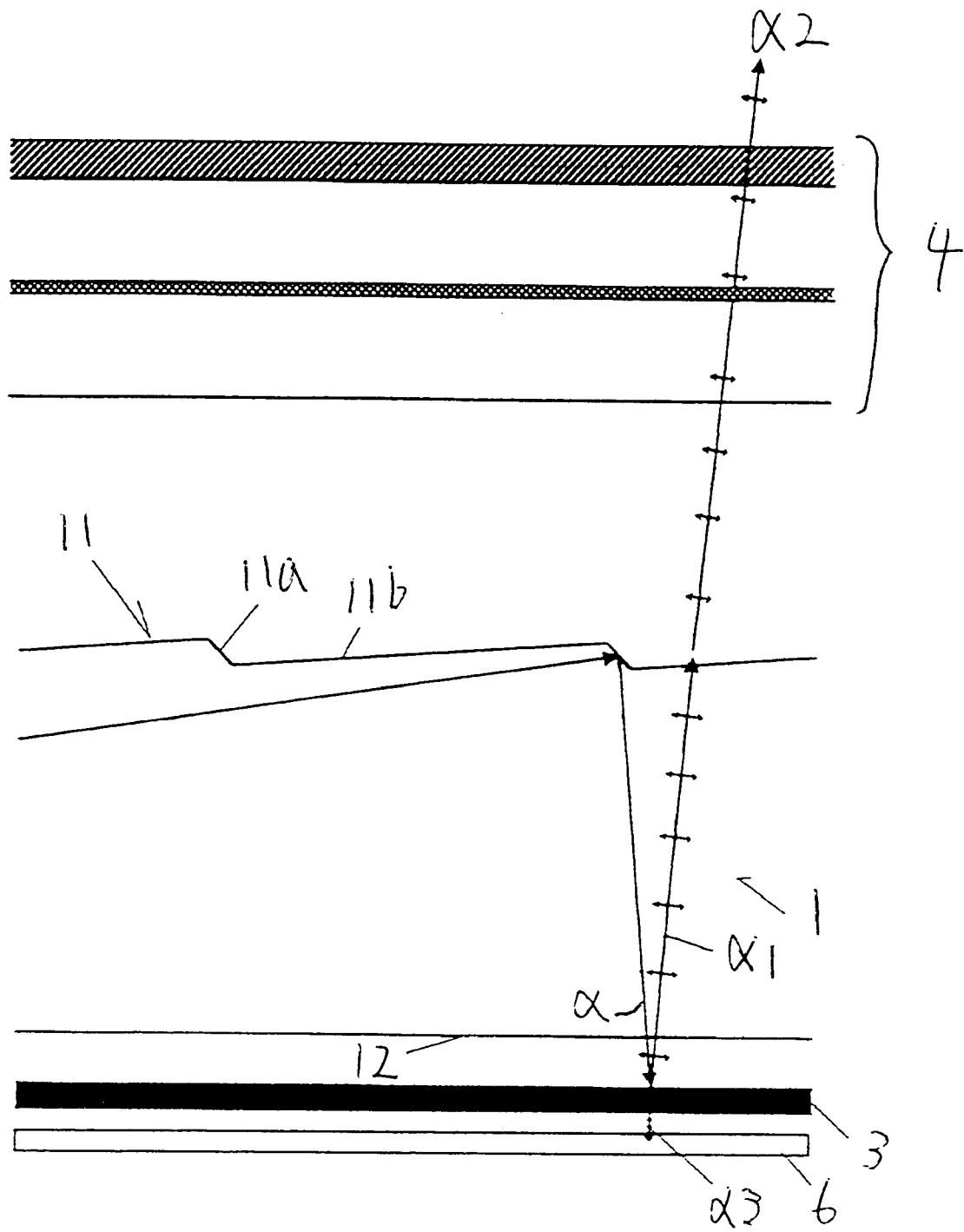
FIG. 3 shows an explanatory view of a visual recognition state in a transmission mode.
Figure 4:
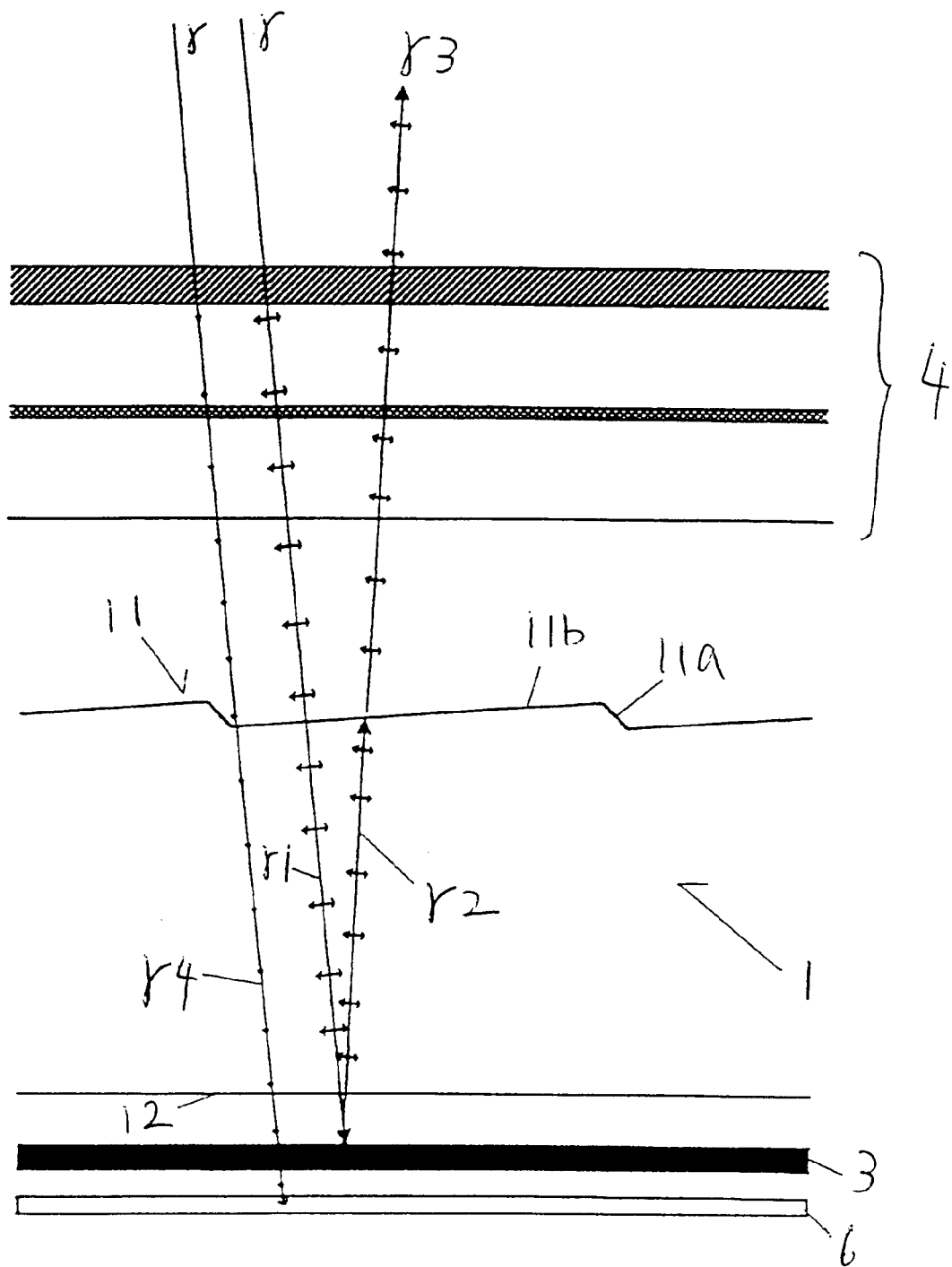
FIG. 4 shows an explanatory view of a visual recognition state in a reflection mode.

On the other hand, the long side surface aims at transmitting the light reflected by the short side surface and inverted through the reflection polarizer 3 as shown by the polygonal line arrow in FIG. 3, and aims at receiving external light in a reflection mode and transmitting the light reflected through the reflection polarizer 3 as shown by the polygonal line arrow in FIG. 4. From this point of view, the inclination angle $\theta_2$ of the long side surface with respect to the reference plane 12a of the lower surface is preferably set to be not larger than 10 degrees. If the inclination angle $\theta_2$ is larger than 10 degrees, the change of the light path due to refraction becomes large, resulting in reduction of light intensity in the frontal direction disadvantageously to display.

Incidentally, the inclination angle $\theta_2$ of the long side surface may be set to be 0 degree. However, if it is set to be larger than 0 degree, transmitted light is allowed to be collimated when the transmitted light incident on the long side surface is reflected so as to be supplied to the short side surface. Hence, the directivity of the reflected light through the short side surface can be improved advantageously to display. From the point of view of increase of light intensity in the frontal direction, collimation of transmitted light, or the like, the preferred inclination angle $\theta_2$ of the long side surface is not larger than 8 degrees, especially not larger than 5 degrees.

The preferred long side surfaces from the point of view of the function, or the like, of the long side surfaces of the light pipe are provided so that the difference between the inclination angles $\theta_2$ of the long side surfaces is set to be within 5 degrees, especially within 4 degrees, particularly within 3 degrees all over the light pipe and that the difference between inclination angles $\theta_2$ of adjacent long side surfaces is set to be within 1 degrees, especially within 0.3 degrees, particularly within 0.1 degrees.

The aforementioned difference between the inclination angles $\theta_2$ is set on the premise that the inclination angle of each long side surface is not larger than 10 degrees as described above. That is, the premise is that such a small inclination angle $\theta_2$ is set to be in the allowed range to suppress deflection of a display image caused by refraction at the time of transmission of light through the long side surface. This aims at setting of an observation point in a direction near the vertical direction so that the direction of optimum visual recognition of the liquid-crystal display device thus optimized is not changed.

A device excellent in efficiency in incidence of external light and excellent in efficiency in light transmitting or outputting of a display image through liquid-crystal cells is preferred to a device which can obtain a brilliant display image. In this respect, prism-like irregularities are preferably provided so that the projected area of each long side surface on to a reference plane of the lower surface is not smaller than 8 times, especially 10 times, particularly 15 times as large as the projected area of each short side surface on the reference plane. By this measure, a large part of the display image through the liquid-crystal cells can be transmitted through the long side surfaces.

Incidentally, when the display image through the liquid-crystal cells is transmitted, the display image incident on the short side surfaces is reflected to the incident side surface side so as not to be output from the upper surface or is deflected in a largely different direction, for example, in the direction opposite to the display image transmitted through the long side surfaces with reference to a normal line with respect to the lower surface so as to be output. Hence, the display image incident on the short side surfaces has little influence on the display image transmitted through the long side surfaces.

Accordingly, it is preferable in this respect that the short side surfaces are not localized relative to pixels of the liquid-crystal cells. Carrying logic to extremes, the display image through the long side surfaces in a direction near the vertical direction is hardly visible when the short side surfaces overlap with the pixels as a whole. Hence, from the point of view of preventing such an unnatural display from being caused by shortage of transmission of display light, or the like, it is preferable that the area of overlap of the short side surfaces with the pixels is reduced to secure sufficient transmissivity of light transmitted through the long side surfaces.

The pixel pitch for the liquid-crystal cells is generally in a range of from 100 to 300 $\mu$m. In consideration of the aforementioned point, the formability of the prism-like irregularities, and so on, the short side surfaces are preferably formed so that the projected width of each short side surface on the reference plane of the lower surface is not larger than 40 $\mu$m, especially in a range of from 1 to 20 $\mu$m, particularly in a range of from 3 to 15 $\mu$m.

Incidentally, a higher-grade technique is required for forming the short side surfaces as the projected width of each short side surface decreases. As a result, a scattering effect may appear as a cause of disorder of the display image, or the like, when the vertex of each of the prism-like irregularities is rounded with a curvature radius of not smaller than a predetermined value. Further, also from the point of view of the coherence length of a fluorescent tube generally set to be about 20 $\mu$m, or the like, there is a tendency that diffraction, or the like, is apt to occur so as to be a cause of lowering of the display quality when the projected width of each short side surface decreases.

Although it is preferable from the aforementioned point that the interval between the short side surfaces is relatively large, illumination at the time of lighting up may become more sparse to bring still an unnatural display when the interval is too large because the short side surfaces substantially serve as a portion having a function for outputting light incident on the side surface. In consideration of these points, the repetition pitch P of the prism-like irregularities as shown, by way of example, in FIG. 2 is preferably set to be in a range of from 50 $\mu$m to 1.5 mm. Incidentally, the pitch may be so irregular as to be provided, for example, as a random pitch, a random or regular combination of a predetermined number of pitch units, or the like. Generally, however, it is preferable to fix the pitch.

In the case of the light output means constituted by prism-like irregularities, moire may occur because of interference with pixels of the liquid-crystal cells. Although prevention of moire can be performed by controlling the pitch of the prism-like irregularities, the pitch of the prism-like irregularities needs to be in a preferred range as described above. Hence, a countermeasure to occurrence of moire in spite of the pitch range becomes a subject of discussion.

According to the present invention, there may be preferably used a method in which the prism-like irregularities are formed to be inclined with respect to the reference plane of the incident side surface so that the prism-like irregularities can be arranged to cross pixels to thereby prevent occurrence of moire. In this case, if the inclination angle is too large, deflection occurs in reflection through the short side surfaces. As a result, the direction of output light is biased largely, so that anisotropy of emitted light intensity in the light-transmitting direction of the light pipe becomes large. As a result, light utilizing efficiency is also lowered, and this is apt to cause lowering of display quality.

It is desirable from this point of view that the direction of arrangement of the prism-like irregularities with respect to the reference plane of the incident side surface, that is, the inclination angle in the ridgeline direction of the prism-like irregularities is within ±35 degrees, preferably within ±30 degrees, more preferably within ±25 degrees. Incidentally, the sign "±" means the direction of inclination with reference to the incident side surface. When resolution. of the liquid-crystal cells is so low that moire does not occur or is negligible, a better result is obtained as the direction of arrangement of the prism-like irregularities is more parallel with the incident side surface.

Any suitable form can be applied to the light pipe as described above. Also when the light pipe is formed like a wedge, or the like, the shape of the light pipe can be determined suitably and any suitable surface shape such as a straight-line surface, a curved surface, or the like, may be applied to the light pipe. Also the slope constituting the light output means and each of the prism-like irregularities may be formed in any surface configuration such as a straight-line surface, a refractive surface, a curved surface, or the like.

Further, the prism-like irregularities may be constituted by a combination of irregularities different in shape, or the like, in addition to the pitch. Further, the prism-like irregularities may be formed as a series of projections or recesses having continuous ridge lines or may be formed as intermittent projections or recesses which are arranged discontinuously in a ridge direction at intervals of a predetermined pitch.

The respective shapes of the lower and. incident side surfaces of the light pipe need not be particularly limited but may be determined suitably. Generally, these surfaces are provided as a flat lower surface and an incident side surface perpendicular to the lower surface. The incident side surface may be formed, for example, into a concavely curved shape, or the like, corresponding to the outer circumference, or the like, of the light source so that improvement of light-incidence efficiency is attained. In addition, an incident side surface structure having an introductory portion interposed between the incident side surface and the light source may be provided. The shape of the introductory portion may be determined suitably in accordance with the shape of the light source, or the like.

The light pipe may be made of any suitable material which exhibits transparency in accordance with the wavelength range of the light source. Examples of the material used in a visible light range include transparent resin, for example, represented by acrylic resin, polycarbonate resin, epoxy resin, or the like; glass; and so on. A light pipe made of a material exhibiting no double refraction or slight double refraction is preferably used.

The light pipe may be formed by a cutting method or by any suitable method. Examples of the preferred producing method from the point of view of mass production, or the like, are: a method of transferring a shape to thermoplastic resin in a condition that the thermoplastic resin is hot-pressed against a mold capable of forming a predetermined shape; a method of filling a mold capable of forming a predetermined shape with hot-melted thermoplastic resin or with resin fluidized by heat or by a solvent; a method of performing a polymerizing process after filling a mold capable of forming a predetermined shape with liquid resin polymerizable by heat, by ultraviolet rays, by radiation, etc., or after casting the liquid resin in the mold; and so on.

Incidentally, the light pipe may be formed as a laminate of parts made of one kind of material or different kinds of materials, such as for example a laminate of a light-guide portion having a role of light transmission and a sheet having light output means (upper surface) such as prism-like irregularities, or the like, formed thereon. The sheet is bonded to the light-guide portion. That is, the light pipe need not be formed as an integral single-layer body constituted by one kind of material.

The thickness of the light pipe can be determined suitably on the basis of the size of the light pipe, the size of the light source, etc. in accordance with the purpose of use. The general thickness of the light pipe in use for forming a liquid-crystal display device, or the like, is not larger than 5 mm, especially in a range of from 0.1 to 3 mm, particularly in a range of from 0.3 to 2 mm, on the basis of the incident side surface thereof.

Before the attachment of the reflection polarizer, the referred light pipe from the point of view of achievement of brilliant display, or the like, is provided so that the total light-rays transmissivity of incident light in directions of the upper and lower surfaces, particularly vertical incident light from the lower surface to the upper surface, is not lower than 90%, especially not lower than 92%, particularly not lower than 95% and that the haze is not higher than 30%, especially not higher than 15%, particularly not higher than 10%.

According to the aforementioned light pipe, incident light from the upper and lower surfaces passes through the lower or upper surface effectively. Hence, use of the light pipe makes it possible to form various devices such as a liquid-crystal display device, which can be used both in a reflection and a transmission mode and which is brilliant, easy to see and excellent in low electric power consumption because light accurately collimated by the light pipe is output in a direction excellent in perpendicularity advantageous to visual recognition so that the light emitted from the light source can be utilized efficiently.

In the liquid-crystal display device for use both in a reflection and a transmission mode, the arrangement of the reflection layer is essential for achievement of display in a reflection mode. According to the present invention, the reflection polarizer for supplying linearly polarized light by reflecting natural light is used as the reflection layer. By the reflection polarizer, the linearly polarized light can be utilized for liquid-crystal display, so that the polarizing plate on the visual recognition back surface can be omitted. As shown in FIG. 1, the reflection polarizer 3 is arranged on the lower surface 12 of the light pipe 1. In this case, the reflection polarizer 3 may be disposed separately from the lower surface of the light pipe. The reflection polarizer 3 is, however, preferably in contact with the lower surface so as to be integrated therewith as shown in FIG. 1. The contact-integrating process can be performed by a suitable method such as a method using adhesive means constituted by a tacky layer, another adhesive layer, or the like.

The reflection polarizer may be made of a suitable material for supplying linearly polarized light by reflecting natural light. An example of the reflection polarizer is a circular polarization separating layer such as a cholesteric liquid-crystal oriented layer for separating natural light into left and right parts of circularly polarized light through reflection and transmission.

Another example of the aforementioned reflection polarizer is a multilayer film which transmits linearly polarized light with a predetermined polarization axis and reflects light other than the linearly polarized light, such as a multilayer film which is composed of birefringent organic films in such a manner that a large number, for example, 10 to 1000, of one kind of polymer layers or two or more kinds of polymer layers different in photoelastic coefficient are laminated and the laminate is stretched to make refractive indices coincident in a predetermined direction in a plane, and to make refractive indices different in a direction perpendicular to the predetermined direction. The example may be a multilayer film containing a repeated laminate structure with birefringent thin films and isotropic thin films, or the like.

The aforementioned cholesteric liquid crystal exhibits a function of separating light into circularly polarized light part different in wavelength characteristic on the basis of the difference in helical pitch of Grandjean orientation. According to the present invention, the cholesteric liquid crystal may be of a suitable-form circular polarization separating layer such as a circular polarization separating layer with the helical pitch changing in a direction of the thickness thereof, a circular polarization separating layer made of a superposed body of two or more cholesteric liquid-crystal layers different in the central wavelength of reflected light, a circular polarization separating layer formed as a composite of the aforementioned circular polarization separating layers by superposing two or more cholesteric liquid-crystal layers different in helical pitch in order of length based on the central wavelength of reflected light so that the helical pitch changes in the direction of the thickness thereof, or the like.

The superposition of two or three or more cholesteric liquid-crystal layers different in the helical pitch change in the thickwise direction and the central wavelength of reflected light, that is, different in helical pitch, aims at applying the separating function to a wider wave range. That is, in a single cholesteric liquid-crystal layer oriented in a predetermined direction, a wave range exhibiting a selective reflection property (circular-polarization dichroism) is generally limited. Although the lamination of the wave range may reach a wide range, such as an about 100 nm wave range, even the wave range falls far short of the whole range of visible light required for application to a liquid-crystal display device, or the like. Hence, the superposition aims at widening the helical pitch change range to thereby widen the wave range exhibiting circular-polarization dichroism.

Incidentally, the circular polarization separating layer, which can cover the visible light range, can be formed efficiently by superposing several kinds of:cholesteric liquid-crystal layers with a central wavelength range of from 300 to 900 nm for selective reflection and different in helical pitch in such a combination that circularly polarized light in the same direction is reflected. Incidentally, the superposition of cholesteric liquid-crystal layers reflecting circularly polarized light in the same direction in combination aims at making the phase state of circularly polarized light reflected by the respective layers uniform so that variations in the polarized state in the respective wave ranges are prevented from being generated to thereby increase the quantity of polarized light in a utilizable state.

A low molecular weight cholesteric liquid crystal, or the like, may be used for the formation of the circular polarization separating layer. From the point of view of the handling property, the thin-film characteristic, etc. of the resulting reflection polarizer, a cholesteric liquid-crystal polymer is preferably used. In this case, the reflection polarizer may be obtained as a single layer body of a cholesteric liquid-crystal polymer film, or the like, or as a multilayer body of the cholesteric liquid-crystal polymer film supported by a plastic film, or the like. The reflection polarizer preferred from the point of view of enlargement, or the like, of the visual field angle for good visual recognition of the liquid-crystal display device, or the like, is made of a cholesteric liquid-crystal polymer which is Grandjean oriented in a faultless state of its domain, or the like.

Incidentally, any suitable polymer may be used as the cholesteric liquid-crystal polymer without any particular limitation. Hence, various kinds of polymers such as a main chain type or side chain type polymer in which a conjugate linear atom group (mesogen) for donating liquid-crystal orientation is introduced into the main or side chain of the polymer, etc. may be used. The wave range for selective reflection becomes wider as the difference between indices of double refraction increases. Accordingly, a cholesteric liquid-crystal polymer large in the difference between indices of double refraction may be preferably used from the point of view of reduction of the number of layers, room for wavelength shifting at a large visual field angle, etc. Incidentally, the liquid-crystal polymer preferred from the point of view of the handling property, stability of orientation at a practical temperature, etc. is a polymer having a glass transition temperature in a range of from 30 to 150° C.

Incidentally, an example of the aforementioned main chain type liquid-crystal polymer includes a polymer having a structure in which a mesogen group made of a para-substitutional cyclic compound, etc. is bonded through a spacer portion for donating flexibility as occasion demands. Specific examples of the polymer include polyester polymers, polyamide polymers, polycarbonate polymers, polyester-imide polymers, etc.

On the other hand, an example of the side chain type liquid-crystal polymer includes a polymer which contains, as a frame of a main chain, polyacrylate, polymethacrylate, polysiloxane, polymalonate, or the like and contains, as a side chain, a low-molecular liquid-crystal compound (mesogen portion) made of a para-substitutional cyclic compound,. etc. through a spacer portion made of a conjugate atom group as occasion demands. Specific examples of the polymer include nematic liquid-crystal polymers containing low-molecular chiral agents, liquid-crystal polymers having chiral components introduced therein, mixed liquid-crystal polymers of nematic and cholesteric liquid-crystal polymers, and so on.

Even the polymer having a para-substitutional cyclic compound for donating nematic orientation constituted by para-substitutional aromatic units, para-substitutional cyclohexyl cyclic units, etc. such as an azomethyne type, an azo type, an azoxy type, an ester type, a biphenyl type, a phenylcyclohexane type, or a bicyclohexane type, can be cholesterically oriented by a method of introducing a suitable chiral component, a low-molecular chiral agent, or the like, made of an asymmetric carbon-containing compound, or the like, (Japanese Patent Publication No. Sho. 55-21479, U.S. Pat. No. 5,332,522, and so on). Incidentally, the terminal substitutional group in a para position in the para-substitutional cyclic compound may be a suitable group such as a cyano group, an alkyl group, an alkoxy group, or the like.

Further, examples of the spacer portion include a polymethylene chain —$(CH_2)_n$—, a polyoxymethylene chain— $(CH_2CH_2O)_m$—, etc. exhibiting flexibility. The number of repetition of structural units forming the spacer portion is determined suitably on the basis of the chemical structure, etc. of the mesogen portion. In the case of a polymethylene chain, the number n is generally in a range of from 0 to 20, especially in a range of from 2 to 12. In the case of a polyoxymethylene chain, the number m is generally in a range of from 0 to 10, especially in a range of from 1 to 3.

The formation of the circular polarization separating layer from the cholesteric liquid-crystal polymer can be performed by a method according to the background-art low-molecular liquid-crystal orientation process. Incidentally, an example of the method includes a method comprising the steps of: spreading a liquid-crystal polymer on a suitable oriented film such as an oriented film prepared by forming a film of polyimide, polyvinyl alcohol, polyester, polyarylate, polyamide-imide, polyether-imide, or the like, on a support base material and rubbing the film with a rayon fabric, or the like, an obliquely vapor deposited layer of $SiO_2$, an oriented film subjected to a stretching process, or the like; heating the liquid-crystal polymer at a temperature not lower than the glass transition temperature but lower than the isotropic phase transition temperature; and cooling the liquid-crystal polymer to a temperature lower than the glass transition temperature in a Grandjean oriented state of the liquid-crystal polymer molecules to thereby make the liquid-crystal polymer in a glass state, resulting in formation of a solidified layer having fixed orientation.

A suitable material such as a single or laminated layer or a stretched film of plastics such as triacetyl cellulose, polyvinyl alcohol, polyimide, polyarylate, polyester, polycarbonate, polysulfone, polyether-sulfone, amorphous polyolefin, denatured acrylic polymer, or epoxy resin; a glass plate; or the like; may be used as the support base material. A plastic film is preferred from the point of view of reduction of thickness, etc.

For example, the spreading of the liquid-crystal polymer can be performed by a method of spreading a solution of the liquid-crystal polymer dissolved in a solvent in the form of a thin layer by a suitable method such as a spin coating method, a roll coating method, a flow coating method, a printing method, a dip coating method, a cast coating method, or the like, and drying the thin layer as occasion demands. Especially, a method such as a spin coating method, or the like, is preferred because a film excellent in uniformity of thickness can be formed. Incidentally, a suitable solvent such as methylene chloride, cyclohexanone, trichloroethylene, tetrachloroethane, N-methylpyrolidone, tetrahydrofuran, or the like, may be used as the solvent.

The heating process for orienting the spread layer of the liquid-crystal polymer can be performed by heating the liquid-crystal polymer in a temperature range of from the glass transition temperature to the isotropic phase transition temperature of the liquid-crystal polymer as described above, that is, in a temperature range in which the liquid-crystal polymer exhibits a liquid-crystal phase. Further, the fixation of the oriented state can be performed by cooling the liquid-crystal polymer to a lower temperature than the glass transition temperature. The condition for cooling is not particularly limited. Because the heating process can be generally performed at a temperature not higher than 300° C., a naturally cooling method is generally employed. Incidentally, various additives such as a stabilizer, a plasticizer, metals, etc., can be mixed with the spread solution of the cholesteric liquid-crystal polymer as occasion demands.

The preferred thickness of the solidified liquid-crystal polymer layer formed on the support base material is in a range of from 0.5 to 50 µm, especially in a range of from 1 to 30 µm, particularly in a range of from 2 to 10 µm, from the point of view of the prevention of orientation disorder and lowering of transmissivity, the width of the wave range for selection reflection, etc. The solidified liquid-crystal polymer layer on the support base material may be integrated with the support base material or may be used as a film, or the like, separated from the support base material. Incidentally, when the solidified liquid-crystal polymer layer has the support base material, the preferred total thickness of the layer inclusive of the base material is in a range of from 2 to 500 µm, especially in a range of from 5 to 300 µm, particularly in a range of from 10 to 200 µm.

Incidentally, the production of the aforementioned circular polarization separating layer with its helical pitch changing in a direction of the thickness thereof can be performed, for example, by an operation of sticking a predetermined number, two or three or more, of oriented cholesteric liquid-crystal polymer layers to one another by hot pressing. A suitable method such as a method of heating the cholesteric liquid-crystal polymer layers to a temperature not lower than the glass transition temperature but lower than the isotropic phase transition temperature through suitable hot pressing means such as a roll laminator to thereby contact-bond the cholesteric liquid-crystal polymer layers to one another can be employed for the hot pressing process. In the case of solidified liquid-crystal polymer layers integrated with support base materials respectively, the circular polarization separating layer with its helical pitch changing in a direction of the thickness thereof can be obtained by superposing the solidified layers in accordance with the above description so as to bring the solidified layers into contact with each other.

The reflection polarizer having the aforementioned circular polarization separating layer is used with a quarter-wave plate added to one surface of the reflection polarizer in order to obtain reflected light of linearly polarized light. The quarter-wave plate, which aims at linearly polarizing circularly polarized light transmitted through the circular polarization separating layer, is disposed so that the quarter-wave plate side becomes the light pipe side.

The quarter-wave plate may be made of one phase difference layer or of two or more phase difference layers. In the case of a visible light range, a quarter-wave plate with a frontal phase difference in a range of from 100 to 180 nm is preferably used from the point of view of the linear polarization effect, compensation for the color change caused by obliquely transmitted light, etc. That is, the quarter-wave plate used preferably satisfies the formula: $(nx-ny)d=\Delta nd=$ from 100 to 180 nm when nx represents the maximum refractive index in a plane, ny represents the refractive index in a direction perpendicular to the plane, nz represents the refractive index in a direction of the thickness of the quarter-wave plate, and d represents the thickness of the quarter-wave plate.

A phase difference layer, which may be used, as occasion demands, together with the foregoing phase difference layer exhibiting the function of the aforementioned quarter-wave plate, is provided for compensation's sake so that the color balance of light obliquely transmitted through the phase difference layer exhibiting the quarter-wave plate function is made more coincident with the color balance of light perpendicularly transmitted through the phase difference layer so that intermediate colors less colored unnaturally can be visually recognized through the absorption polarizing plate. A phase difference layer with a frontal phase difference ($\Delta nd$) in a range of from 100 to 720 nm is preferably used.

The phase difference layer can be made of any material at option. A material excellent in transparency and especially exhibiting light transmissivity of not lower than 80% to donate a uniform phase difference is preferred. Examples of the material used generally are stretched films and liquid-crystal polymers made of polyolefins such as polycarbonate, polyester, polysulfone, polyether-sulfone, polystyrene, polyethylene, and polypropylene, and plastics such as polyvinyl alcohol, cellulose acetate polymer, polyvinyl chloride, polyvinylidene chloride, polyarylate, polymethyl methacrylate, polyamide, etc. Especially, liquid-crystal polymers oriented twistedly are used preferably.

The aforementioned phase difference layer having a large refractive. index in a direction of the thickness thereof. can be formed by a suitable method such as a method in which a film formed of the aforementioned polymer, or the like, by a suitable method such as a casting method, an extrusion method, or the like, is stretched or contracted under heat by a uniaxial or biaxial method while the film is bonded to a heat-shrinkable film.

The aforementioned characteristic such as $\Delta nd$, etc. of the phase difference layer can be controlled by changing the condition such as the material and thickness of the film, the magnification of stretch (contraction), the temperature for stretch (contraction), etc. The general thickness of the phase difference layer is in a range of from 10 to 500 µm, especially in a range of from 20 to 200 µm in terms of a single layer. The thickness is not limited thereto.

Incidentally, when a phase difference layer such as a quarter-wave plate is made of a liquid-crystal polymer, the phase difference layer can be obtained as a plate having a suitable form such as a liquid-crystal polymer oriented film, a liquid-crystal polymer oriented layer supported by a transparent base material, or the like, in accordance with the case of the aforementioned circular polarization separating layer. In the case of using a liquid-crystal polymer, an aimed phase difference layer can be formed without any stretching process.

The quarter-wave plate may be constituted by a single phase difference layer as described above or may be formed by a superposed body of two or three or more phase difference layers different in phase difference. Superposition of the phase difference layers different in phase difference is effective for enlargement of the wave range permitting the function of the quarter-wave plate or the compensating plate as an object. When a superposed body of phase difference layers is used, it is preferable from the aforementioned point of view that one phase difference layer having a higher refractive index in a thickwise direction than at least one of in-plane refractive indices is disposed or two or more phase difference layers having higher refractive indices in a thickwise direction than at least one of in-plane refractive indices are disposed.

When the liquid-crystal display device is to be formed, the light source 2 is disposed near to the incident side surface 13 of the light pipe 1 as shown in FIG. 1, so that the light source 2 serves as the back light of a side light type. Any suitable material can be used as the light source. Examples of the material which can be used preferably are: a linear light source such as a (cold or hot) cathode tube, or the like; a point light source such as a light-emitting diode, or the like; an array of point light sources arranged in a line, a plane, or the like; a light source using a system for converting a point light source into a regular-interval or irregular-interval linear light-emitting state; and so on.

According to the present invention, the light source is provided to make visual recognition possible in a transmission mode. Accordingly, the light source is provided so as to be able to be switched on/off because it is not necessary to switch the light source on for visual recognition in a reflection mode. Any method can be employed as a method for switching the light source on/off. Any one of background-art methods may be employed. Incidentally, the light source may be attached to the light pipe in advance so that the light pipe can be disposed in the form of a light pipe having a light source.

For the formation of the liquid-crystal display device, the light source may be provided as a combination body in which suitable auxiliary means such as a light source holder for surrounding the light source to lead scattered light from the light source 2 to the incident side surface 13 of the light pipe 1 is disposed as occasion demands. A resin sheet with a high-reflectivity metal thin film attached thereto, metal foil, or the like, is generally used as the light source holder. When the light source holder is bonded to an end portion of the light pipe through an adhesive, or the like, the formation of the light output means in the adhesive portion may be omitted.

Incidentally, the liquid-crystal display device is generally formed, as shown in FIG. 1, by suitably assembling the liquid-crystal cells 42, a driver attached to the liquid-crystal cells 42, the polarizing plate 41, the back light 1 and 2, the reflection polarizer 3 and constituent parts such as a compensating phase difference plate, etc. as occasion demands. The liquid-crystal cells 42 are provided with a transparent electrode (not shown) so as to function as a liquid-crystal shutter.

The liquid-crystal cells to be used are not particularly limited. For example, in classification based on the form of orientation of the liquid crystal, TN liquid-crystal cells or STN liquid-crystal cells, perpendicularly oriented cells or HAN cells, twisted cells such as OCB cells or non-twisted cells, guest-host type cells or ferroelectric liquid-crystal type liquid-crystal cells, etc. may be used suitably. Further, the liquid crystal driving system is not particularly limited. For example, a suitable driving system such as an active matrix system, a passive matrix system, or the like, may be used.

Although any suitable plate can be used as the polarizing plate, a polarizing plate such as an iodine type or dye type absorption linear polarizer high in the degree of polarization may be preferably used from the point of view of obtaining a display having a good contrast ratio based on incidence of high-grade linearly polarized light. Incidentally, from the point of view of reducing absorption loss to improve the brightness, the polarizing plate is generally provided only on the visual recognition side of the liquid-crystal cells 42, as shown in FIG. 1, but the present invention does not limit provision of a pair of polarizing plates on both sides of the liquid-crystal cells.

For the formation of the liquid-crystal display device, for example, a light diffusion layer and a light absorption layer, an anti-glare layer and a protective layer, or suitable optical elements such as a compensating phase difference plate to be provided between the liquid-crystal cell and the polarizing plate may be arranged suitably. One light diffusion layer or two or more light diffusion layers can be disposed in suitable positions for the purposes of suppression of occurrence of moire, diffusion of display light, and so on.

The light diffusion layer, which aims at suppressing occurrence of moire, is preferably disposed between the reflection polarizer 3 and the liquid-crystal cells 42 as shown in FIG. 1. In this case, the light diffusion layer is preferably provided as a light diffusion layer 5 having a polarization-keeping property so that the polarized state of linearly polarized light is not eliminated. The diffusion intensity thereof is preferably in a range of from 5 to 15 degrees in terms of an average diffusion angle but the diffusion intensity is not limited thereto. On the other hand, the light diffusion layer, which aims at diffusing display light, is preferably provided on the visual recognition side of the liquid-crystal cells.

The light diffusion layer can be formed by a suitable method according to the background art, such as a mechanical or chemical processing method using embossing, buffing or transferring a rough-surface shape of a metal mold, a method of performing impregnation with suitable particles such as inorganic particles of silica, alumina, titania, zirconia, tin oxide, indium oxide, cadmium oxide, antimony oxide, etc. which may be electrically conductive, organic particles of crosslinked or non-crosslinked polymers, etc., or the like, a method of applying the impregnated layer, or the like. Accordingly, the light diffusion layer can be formed to have a suitable form such as a predetermined surface after surface roughening, a diffusion sheet, or the like.

On the other hand, the aforementioned light absorption layer, which aims at absorbing light transmitted through the reflection polarizer, is disposed on the light transmission side of the reflection polarizer 3 as shown in FIG. 1 as occasion demands. According to the present invention, the light absorption layer is preferably provided as shown in FIG. 1 because there is a possibility that display quality such as contrast, or the like, is lowered when light transmitted through the reflection polarizer is incident to and transmitted through the reflection polarizer again by scattering, reflection, or the like. The light absorption layer can be made of a suitable material according to the background-art absorption layer. According to the present invention, the light absorption layer need not be of a semi-transmission type but may be of a full absorption type rather preferably.

On the other hand, the compensating phase difference plate aims at compensating double refraction's dependence on wavelength to attain an improvement in visual recognition, or the like. The compensating phase difference plate is disposed on the visual recognition side or/and between the polarizing plate on the visual recognition back surface and the liquid-crystal cell, or the like, as occasion demands. According to the present invention, it is preferable from the point of view of keeping the light output property of the light pipe as sufficiently as possible that the optical layer disposed between the liquid-crystal cell and the light pipe is as small as possible. Incidentally, a suitable plate can be used as the compensating phase difference plate in accordance with the wave range, or the like. The compensating phase difference plate may be formed as a single layer or as a layer of superposition of two or more phase difference layers.

Visual recognition on the liquid-crystal display device according to the present invention is performed through light transmitted through the long side surfaces of the light pipe as described above. Incidentally, in a transmission mode, natural light α emitted from the lower surface of the light pipe 1 in the switched-on state of the light source as shown by the arrow in FIG. 3 is reflected through the reflection polarizer 3 to thereby form linearly polarized light α1 necessary for display. The linearly polarized light α1 is transmitted through the long side surfaces 11b of the light pipe 1. As a result, a display image (α2) is visually recognized via the liquid-crystal cells 42 and the polarizing plate 41. Incidentally, light α3 transmitted through the reflection polarizer is absorbed to the light absorption layer 6.

On the other hand, in a reflection mode, external light γ constituted by natural light in the switched-off state of the light source as shown by the arrow in FIG. 4 is transmitted as linearly polarized light through the long side surfaces 11b of the upper surface of the light pipe 1 via the polarizing plate 41 and the liquid-crystal cells 42. Among the transmitted light, linearly polarized light γ1 for white display is reflected through the reflection polarizer 3. The linearly polarized light γ2 reflected thus is transmitted through the long side surfaces 11b of the light pipe 1. As a result, a display image (γ3) is visually recognized via the liquid-crystal cells 42 and the polarizing plate 41. On the other hand, linear polarized light γ4 for black display is transmitted through the reflection polarizer and absorbed to the light absorption layer 6.

According to the present invention, optical elements or parts such as the light pipe, the reflection polarizer, the liquid-crystal cells, the polarizing plate, etc. constituting the aforementioned liquid-crystal display device may be wholly or partially laminated and fixed so as to be integrated with one another or may be disposed in an easily separable state. From the point of view of prevention of lowering of contrast due to suppression of interfacial reflection, or the like, it is preferable that the optical elements or parts are fixed. A suitable transparent adhesive such as an adhesive can be used for the fixing and contacting process. In addition, the transparent adhesive layer may be impregnated with the aforementioned fine particles, or the like, so that the transparent adhesive layer can be provided as an adhesive layer exhibiting a diffusing function.

EXAMPLE 1

A surface of a polymethyl methacrylate plate processed into a predetermined shape in advance was cut by a diamond bit so that a light pipe having light output means at its upper surface was obtained. The light pipe was 40 mm wide and 25 mm deep. The light pipe was 1 mm thick at its incident side surface and 0.6 mm thick at its opposite end. Upper and lower surfaces of the light pipe were flat. The light pipe had prism-like irregularities at its upper surface. The prism-like irregularities were arranged at intervals of a pitch of 210 $\mu$m so as to be parallel with the incident side surface. Each of the prism-like irregularities had a short side surface inclined at an inclination angle changing in a range of from 42.5 to 43 degrees, and a long side surface inclined at an inclination angle changing in a range of from 1.8 to 3.5 degrees. The change of the inclination angle between adjacent long side surfaces was within 0.1 degrees. The protected width of the short side surface on the lower surface was from 10 to 16 $\mu$m. The projected area ratio of long side surface/short side surface on the lower surface was not lower than 12. Incidentally, the light output means was formed so as to extend from a position at a distance of 2 mm from the incident side surface.

A cold-cathode tube (made by HARISON ELECTRIC Co., Ltd.) with a diameter of 2.4 mm was disposed near to the incident side surface of the light pipe. An edge of the cold-cathode tube was surrounded by a light source holder made of a white lamp reflection sheet so as to be in contact with the upper and lower end surfaces of the light pipe. An inverter and a DC power supply were connected to the cold-cathode tube. A reflection polarizer was disposed on the lower surface of the light pipe. Monochrome TN type liquid-crystal cells in which the polarizing plate on the visual recognition back surface had been removed (but the polarizing plate had been disposed only on the visual recognition side) were disposed on the upper surface of the light pipe. Thus, a liquid-crystal display device was obtained.

Incidentally, the aforementioned light source was able to be switched on/off by turning the DC power supply on/off. Further, the aforementioned reflection polarizer was made of an alternate laminate of birefringent organic thin films and isotropic (non-birefringent) organic thin films. The plane of vibration of light reflected and linearly polarized by the reflection polarizer was parallel with the transmission axis of the polarizing plate removed from the visual recognition back surface as described above.

EXAMPLE 2

A liquid-crystal display device was obtained according to Example 1 except that a reflection polarizer was bonded to the lower surface of a light pipe through a tacky layer.

EXAMPLE 3

A liquid-crystal display device was obtained according to Example 1 except that a laminate (PCF350, made by NITTO DENKO Corp.) including a cholesteric circular polarization separating plate and a quarter-wave plate was used as the reflection polarizer. Incidentally, the quarter-wave plate side was set as the liquid-crystal cell side.

EXAMPLE 4

A liquid-crystal display device was obtained according to Example 1 except that a light diffusion sheet made of a tacky layer containing light-scattering fine particles (made by GE-Toshiba Silicone Co., Ltd.) supported by a triacetyl cellulose film 80 $\mu$m thick was bonded to liquid-crystal cells at the visual recognition back surface. Incidentally, the light diffusion sheet exhibited transmissivity of 1.1% in the condition in which the light diffusion sheet was disposed between Glan-Thompson prisms arranged in the form of crossed-Nicol (this condition will apply hereafter).

illuminated by a ring-like illuminator disposed in a position at a distance of 10 cm upward from the center portion of the device.

Results of the aforementioned test were shown in the following Table.

|  |  | Example | 1 | 2 | 3 | 4 | 5 | 6 | 7 | 8 |
|---|---|---|---|---|---|---|---|---|---|---|
| Frontal Brightness ($cd/m^2$) | Transmission Mode | | 405 | 381 | 375 | 386 | 338 | 102 | 251 | 206 |
| | Reflection Mode | | 1067 | 1146 | 1043 | 991 | 794 | 748 | 831 | 620 |

EXAMPLE 5

A liquid-crystal display device was obtained according to Example 2 except that the reflection polarizer was replaced by an aluminum reflection plate and that the polarizing plate on the visual recognition back surface of liquid-crystal cells was kept intact in an adhesive state.

EXAMPLE 6

A liquid-crystal display device was obtained according to Example 1 except that a polymethylmethacrylate plate which was 40 mm wide, 25 mm deep, 1 mythic at the incident side surface and 0.6 mm thick at the opposite end and which had, as its upper surface, light output means formed through a sandblasting process was used as the light pipe.

EXAMPLE 7

A liquid-crystal display device was obtained according to Example 2 except that a plate, which had prism-like irregularities composed of short side surfaces inclined at an inclination angle in a range of from 42.6 to 42.8 degrees, and long side surfaces inclined at an inclination angle in a range of from 6.3 to 9.5 degrees and in which the projected width of each short side surface on the lower surface was in a range of from 25 to 35 µm and in which the projected area ratio of long side surface/short side surface on the lower surface was in a range of from 5 to 7, was used as the light pipe.

EXAMPLE 8

A liquid-crystal display device was obtained according to Example 4 except that a sheet having transmissivity of 5.3% and made of a tacky layer containing light-scattering fine particles supported by a polyethylene terephthalate film 50 µm thick was used as the light diffusion sheet.

Evaluation Test

With respect to the liquid-crystal display device obtained in each of Examples and Comparative Examples, frontal brightness in a white display state in each of transmission and reflection modes was examined by a brightness meter (BM7, made by TOPCON Corp.). Incidentally, frontal brightness in a transmission mode was evaluated in the condition that the light source was switched on in a dark room. On the other hand, frontal brightness in a reflection mode was evaluated in the condition that the light source was switched off in the dark room but the device was It was apparent from Table that Examples 1, 2, 3 and 4 were excellent in brightness both in a transmission mode and in a reflection mode. Particularly, in Example 4, very delicate display with uniform brightness was obtained. Incidentally, in Example 5, lowering of brightness was largely related to absorption loss due to the polarizing plate on the visual recognition side. In Example 6, lowering of brightness in a transmission mode was largely related to frontal darkness due to the large angle of output light as well as lowering of brightness in a reflection mode was caused by diffusion of light, so that blast injury given to the light pipe was observed so conspicuously as to reduce the display quality greatly.

On the other hand, in Example 7, the neighborhood of the light source was brilliant but the display was short of uniformity of brilliance as a whole. In Example 8, coloring was caused by the change of the direction of visual recognition so that the display was hard to see because of the visual recognition of dazzling light as well as brightness was lowered because of elimination of the polarized state compared with Example 4.

It is apparent from the above description that the light source can be switched on/off by turning the power supply on/off to thereby achieve a liquid-crystal display device exhibiting a good display property both in a transmission and a reflection mode and that use of the reflection mode together with the transmission mode permits electric power consumption to be saved so that the working life of a battery for use in a portable display device, or the like, can be made longer.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A liquid-crystal display device comprising:
   a light pipe including light output means formed on an upper surface of said light pipe;
   a light source disposed near to an incident side surface of said light pipe so that incident light from said light source is output from a lower surface of said light pipe through said light output means;
   a reflection polarizer disposed on said lower surface of said light pipe for supplying linearly polarized light obtained by reflecting natural light; and
   a liquid-crystal shutter disposed above said upper surface of said light pipe, said liquid-crystal shutter including liquid crystal cells and at least one polarizing plate.

2. A liquid-crystal display device according to claim 1, wherein said reflection polarizer is in contact with said lower surface of said light pipe so as to be integrated with said light pipe.

3. A liquid-crystal display device according to claim 1, wherein said light source disposed near to the incident side surface of said light pipe can be switched on and off.

4. A liquid-crystal display device according to claim 1, wherein said light pipe has, at its upper surface, light output means which is constituted at least by slopes facing said incident side surface and inclined at an angle of from 35 to 45 degrees with respect to a reference plane of said lower surface, and flat surfaces inclined at a crossing angle of not larger than 10 degrees with respect to said reference plane and provided so that projected area of said flat surfaces on said reference plane is not smaller than 8 times as large as projected area of said slopes on said reference plane.

5. A liquid-crystal display device comprising:
  a light pipe including light pipe output means formed on an upper surface of said light pipe;
  a light source disposed near to an incident side surface of said light pipe so that incident light from said light source is output from a lower surface of said light pipe through said light output means;
  a reflection polarizer disposed on said lower surface of said light pipe for supplying linearly polarized light obtained by reflecting natural light; and
  a liquid-crystal shutter disposed above said upper surface of said light pipe, said liquid-crystal shutter including liquid crystal cells and at least one polarizing plate,
  wherein said light output means on said upper surface of said light pipe is constituted by a repetition structure of continuous or discontinuous prism-like irregularities arranged at intervals of a pitch of from 50 $\mu$m to 1.5 mm, each of said prism-like irregularities having a short side surface and a long side surface,
  said short side surfaces are constituted by slopes inclined downward from the incident side surface toward the opposite end at an inclination angle of from 35 to 45 degrees with respect to a reference plane of said lower surface,
  said long side surfaces are constituted by slopes which are inclined at an inclination angle in a range of from 0 to 10 degrees, exclusive of 0 degree, with respect to said reference plane, and
  wherein a difference in angle between said slopes is less than 5 degrees as a whole, a difference in inclination angle between adjacent long side surfaces is less than 1 degree, and a projected area of the long side surfaces on said reference plane is not smaller than 8 times as large as a projected area of the short side surfaces on said reference plane.

6. A liquid-crystal display device according to claim 5, wherein the repetition pitch of said prism-like irregularities constituting said light output means on said upper surface of said light pipe is fixed.

7. A liquid-crystal display device according to claim 5, wherein a projected width of each of said short side surfaces on said reference plane is not larger than 40 $\mu$m.

8. A liquid-crystal display device according to claim 5, wherein a ridgeline direction of said prism-like irregularities is within ±35 degrees with respect to a reference plane of said incident side surface.

9. A liquid-crystal display device according to claim 1, wherein said light pipe is provided so that incident light from said lower surface is transmitted through said upper surface at total light-rays transmissivity of not lower than 90%.

10. A liquid-crystal display device according to claim 1, wherein said reflection polarizer is made of one member selected from the group consisting of a laminate including a cholesteric liquid-crystal layer and a quarter-wave plate, a multilayer film with one kind or two or more kinds of birefringent organic films, and a multilayer film including a repetitive laminate structure with birefringent thin films and isotropic thin films.

11. A liquid-crystal display device according to claim 1, further comprising a polarization-keeping light diffusion layer disposed between said reflection polarizer and said liquid-crystal cells.

* * * * *